United States Patent
Chen

(10) Patent No.: US 11,419,453 B2
(45) Date of Patent: Aug. 23, 2022

(54) ELECTRIC AND GAS DUAL-PURPOSE FRYING OVEN

(71) Applicant: Jian-Lun Chen, Foshan (CN)

(72) Inventor: Jian-Lun Chen, Foshan (CN)

(73) Assignees: FOSHAN SHUNDE MINGJIAN ELECTRICAL CO., LTD, Foshan (CN); GUANGDONG MINGJIAN ELECTRICAL TECHNOLOGY CO., LTD., Foshan (CN)

( * ) Notice: Subject to any disclaimer, the term of this patent is extended or adjusted under 35 U.S.C. 154(b) by 260 days.

(21) Appl. No.: 16/820,802

(22) Filed: Mar. 17, 2020

(65) Prior Publication Data

US 2020/0329908 A1 Oct. 22, 2020

(30) Foreign Application Priority Data

Apr. 22, 2019 (CN) .......................... 201910324262.6

(51) Int. Cl.
| | |
|---|---|
| *A47J 37/07* | (2006.01) |
| *A47J 37/06* | (2006.01) |
| *A47J 37/04* | (2006.01) |
| *A47J 37/10* | (2006.01) |
| *F24C 1/04* | (2021.01) |
| *F24C 1/14* | (2021.01) |

(52) U.S. Cl.
CPC ......... *A47J 37/0629* (2013.01); *A47J 37/041* (2013.01); *A47J 37/0647* (2013.01); *A47J 37/105* (2013.01); *F24C 1/04* (2013.01); *F24C 1/14* (2013.01)

(58) Field of Classification Search
CPC ........ A47J 37/04; A47J 37/041; A47J 37/042; A47J 37/043; A47J 37/047; A47J 37/049; A47J 37/0629; A47J 37/0641; A47J 37/0647; A47J 37/0652; A47J 37/0676; A47J 37/0682; A47J 37/0688; A47J 37/07; A47J 37/0704; A47J 37/0713; A47J 37/0718; A47J 37/0754; A47J 37/0763; A47J 37/0786; A47J 37/08; A47J 37/0814; A47J 37/0871; A47J 37/105; A47J 37/1247; A47J 37/1266; A47J 37/1252; A47J 37/1276; F24C 1/02; F24C 1/04; F24C 1/14
USPC .......................................... 99/324, 339, 375
See application file for complete search history.

(56) References Cited

U.S. PATENT DOCUMENTS

| | | | | |
|---|---|---|---|---|
| 5,598,769 A | * | 2/1997 | Luebke | A47J 37/042 99/395 |
| 5,639,497 A | * | 6/1997 | Bedford | A47J 37/042 99/331 |
| 2002/0088453 A1 | * | 7/2002 | Yamada | F24C 3/047 126/39 J |

(Continued)

*Primary Examiner* — Hung D Nguyen

(57) ABSTRACT

An electric and gas dual-purpose frying oven includes a shell, door body, oil receiver, synchronous motor, a motor bracket, a sub-clutch and a mother clutch, a grill frying pan, and a frying pan cover, an infrared gas burner and a gas valve. The shell is composed of a control chamber with the front opening and the top opening and a holding chamber with the back lower part. An inlet groove and a pivot joint groove are arranged on the baking chamber. The model comprises an electric heating pipe having a head of the tube body and a seat plate part. The baking cavity is provided with a socket hole. The pipe extends into the baking cavity through the socket hole.

5 Claims, 5 Drawing Sheets

(56) References Cited

U.S. PATENT DOCUMENTS

Figure 1:
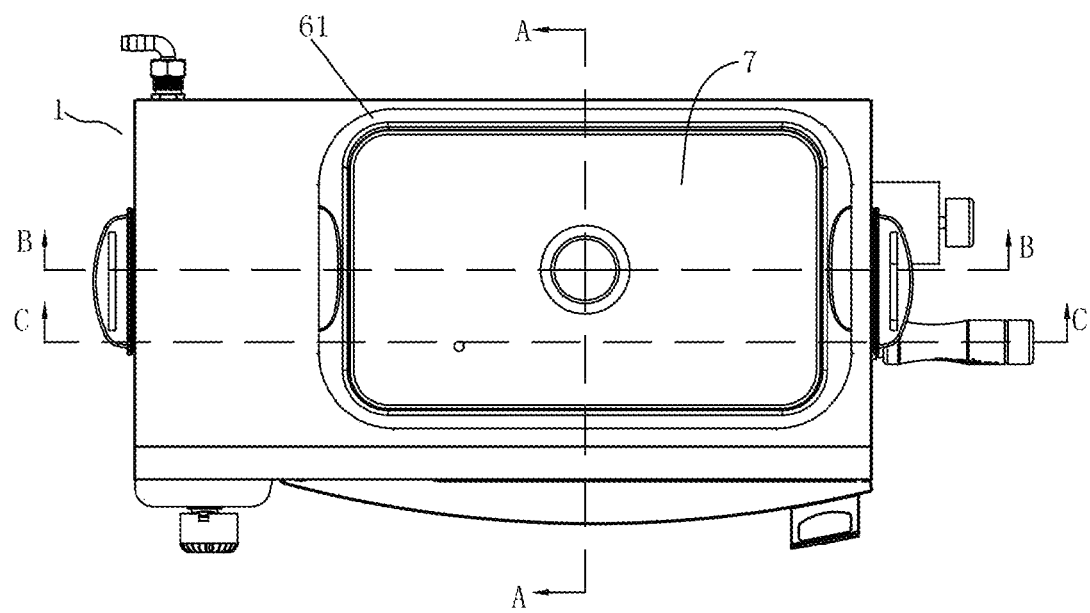

| | | | |
|---|---|---|---|
| 2002/0174779 A1* | 11/2002 | Friedl | A47J 37/042 |
| | | | 99/419 |
| 2006/0021517 A1* | 2/2006 | Best | F23D 14/14 |
| | | | 99/451 |
| 2007/0204852 A1* | 9/2007 | Cohen | A21B 1/02 |
| | | | 126/273.5 |
| 2015/0208861 A1* | 7/2015 | Azzam | A47J 37/0745 |
| | | | 99/395 |
| 2017/0079475 A1* | 3/2017 | Buckley | A47J 37/0641 |
| 2018/0325314 A1* | 11/2018 | Walters | A47J 37/0786 |
| 2019/0142220 A1* | 5/2019 | Shirali | A23L 5/11 |
| | | | 426/231 |
| 2019/0167035 A1* | 6/2019 | Stocker | A47J 37/041 |
| 2021/0259462 A1* | 8/2021 | Kunz | A47J 37/041 |

* cited by examiner

ELECTRIC AND GAS DUAL-PURPOSE FRYING OVEN

TECHNOLOGY

The present invention relates to an electric and gas dual-purpose frying oven.

TECHNOLOGY BACKGROUND

This is an electric and gas dual-purpose frying oven, which including a shell, door body, oil receiver, synchronous motor, a motor bracket, a sub-clutch and a mother clutch, a grill frying pan, and a frying pan cover, an infrared gas burner and a gas valve; The shell is composed of a control chamber with the front opening and the top opening at one end and a holding chamber with the back lower part. An inlet groove and a pivot joint groove communicated with the inlet groove are arranged on the endwall plate of the baking chamber; Between the baking chamber and the control chamber is a rotating hole which is provided with a sub-clutch on the longitudinal wall plate; The grill rotates with the pivot slot, and the clutch works with the sub-clutch. The infrared burner passes through the burner hole and is fixedly connected with the baffle; The frying pan fits into the baking cavity through the top opening, and the ring edge plate of the frying pan matches with the top plate of the baking cavity. The problem is: single function, can only use gas, which is inconvenient

CONTENTS OF THE INVENTION

The purpose of the invention is to provide an electric and gas dual-purpose baking oven, which can use gas and electricity, also is convenient to have function conversion.

This is an electric and gas dual-purpose frying oven, which including a shell, door body, oil receiver, synchronous motor, a motor bracket, a sub-clutch and a mother clutch, a grill frying pan, and a frying pan cover, an infrared gas burner and a gas valve; The shell is composed of a control chamber with the front opening and the top opening at one end and a holding chamber with the back lower part. An inlet groove and a pivot joint groove communicated with the inlet groove are arranged on the endwall plate of the baking chamber; Between the baking chamber and the control chamber is a rotating hole which is provided with a sub-clutch on the longitudinal wall plate; The grill rotates with the pivot slot, and the clutch works with the sub-clutch. The infrared burner passes through the burner hole and is fixedly connected with the baffle; The frying pan fits into the baking cavity through the top opening, and the ring edge plate of the frying pan matches with the top plate of the baking cavity. The model also includes an electric heating pipe, which comprises a head of the tube, body and a seat plate made with the head.

The end wall plate of the baking cavity is provided with a socket hole;

The tube extends into the baking cavity through the socket hole, and the head is connected with the socket hole and can be disassembled.

This is an electric and gas dual-purpose frying oven, includes a rechargeable lithium battery, which is connected with a synchronous motor.

This is an electric and gas dual-purpose frying oven. The synchronous motor is fixedly connected with the motor bracket, and the sub-clutch is arranged in the motor bracket. One end of the sub-clutch is connected with the shaft of the synchronous motor, and the other end is embedded in the rotating hole.

This is an electric and gas dual-purpose oven, its characteristics are as follows: The grill with the clutch includes a axis, food rack, holding handle and a circular rotating seat on which the shaft body is placed. One end of the shaft body is connected with the holding handle, and the other end is the clutch. The circular rotating seat is in coordination with the slide of the leading slot, and the guide slot is in coordination with the pivot slot.

This is an electric and gas dual-purpose frying oven. The special advantage is that the electric heating tube is a light wave tube.

This is an electric and gas dual-purpose frying oven. Because of such structure, when using gas, the electric heating tube can be removed; When using electricity, assemble the electric heating tube; It can also be gas and electric heating pipe used at the same time; It is easy to use.

DESCRIPTION WITH PICTURES

Figure 2:
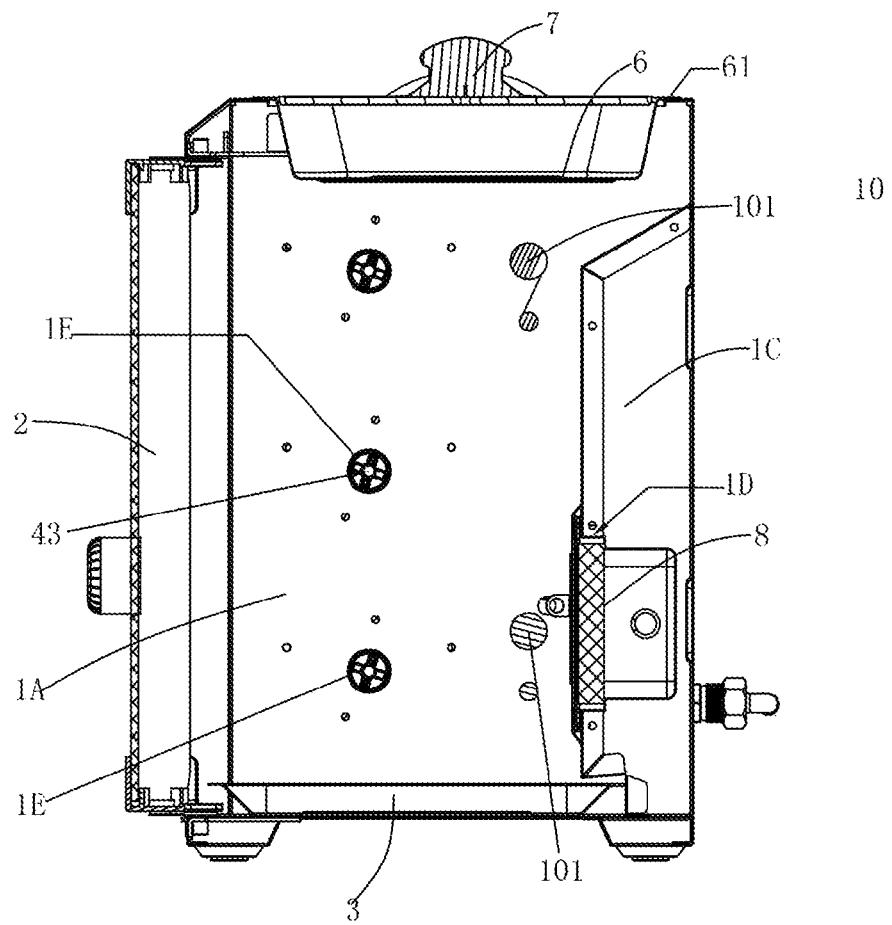
Figure 3:
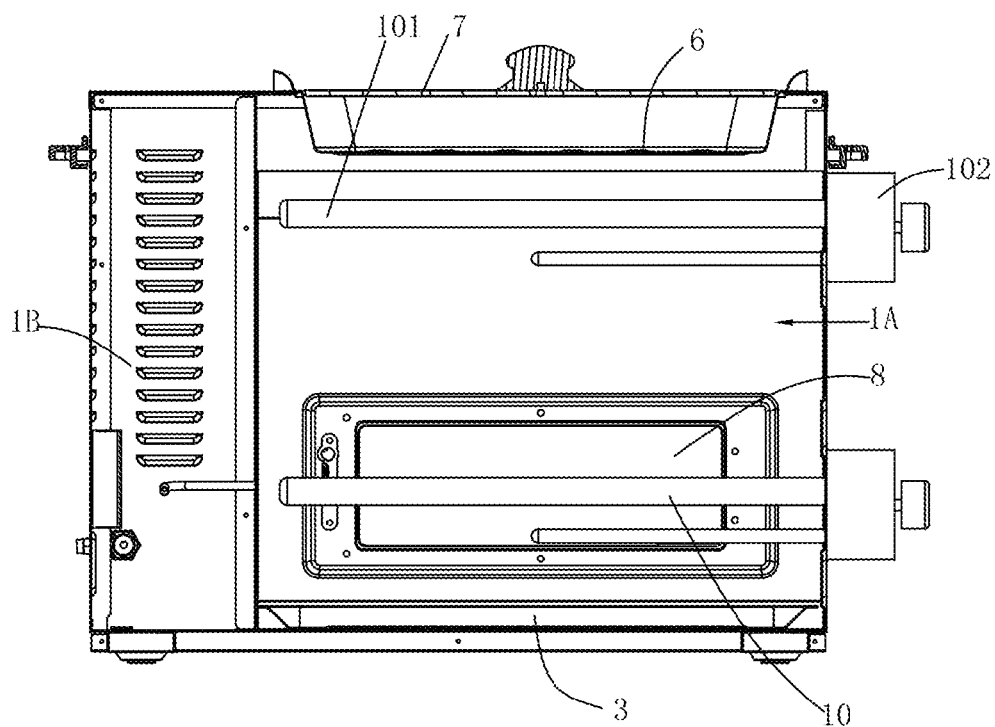
Figure 4:
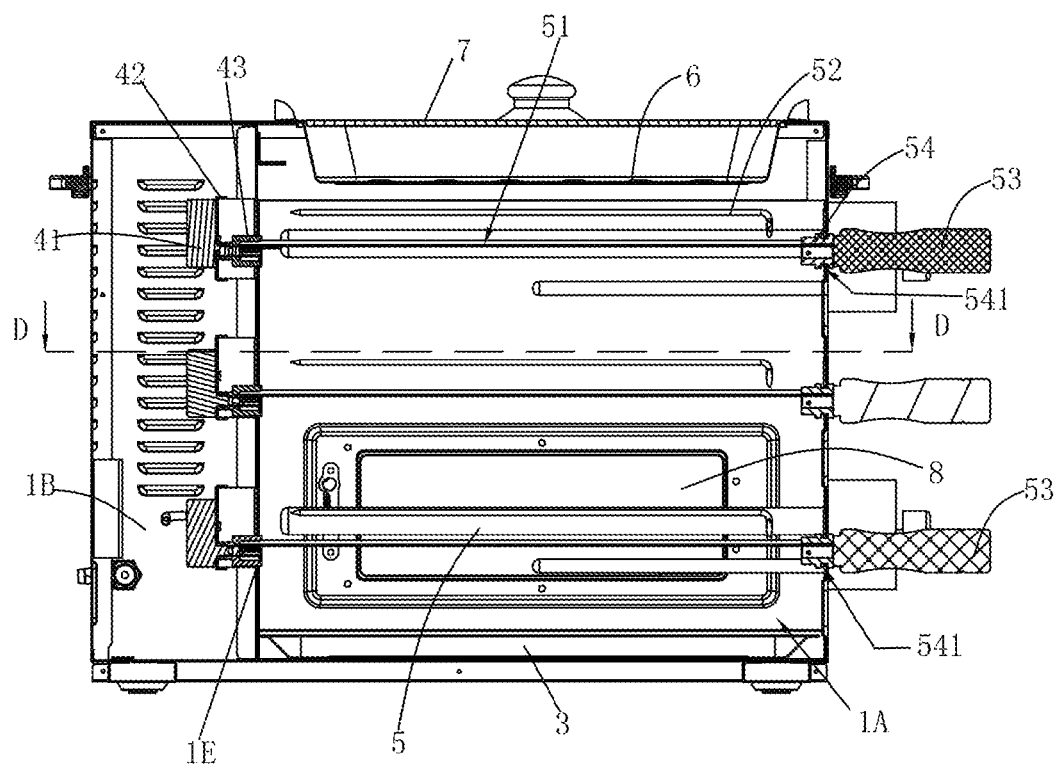
Figure 5:
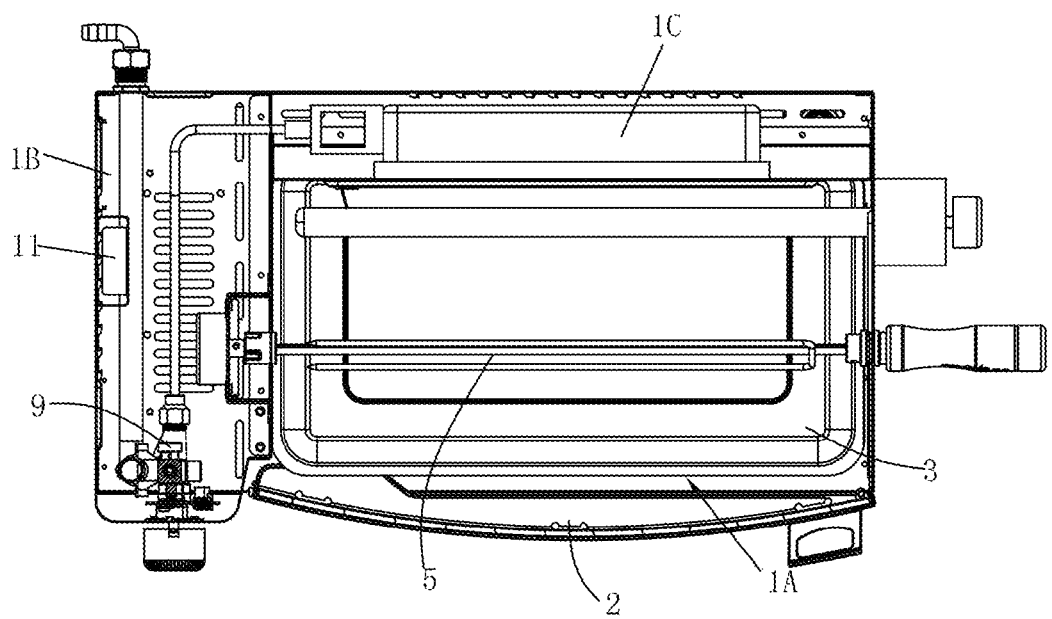
Figure 6:
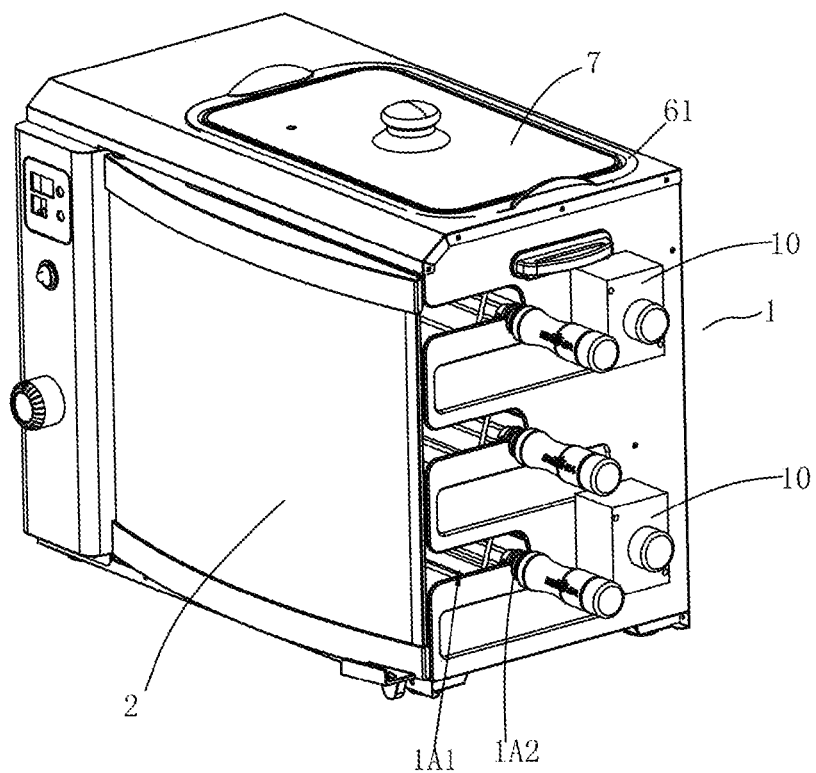
Figure 7:
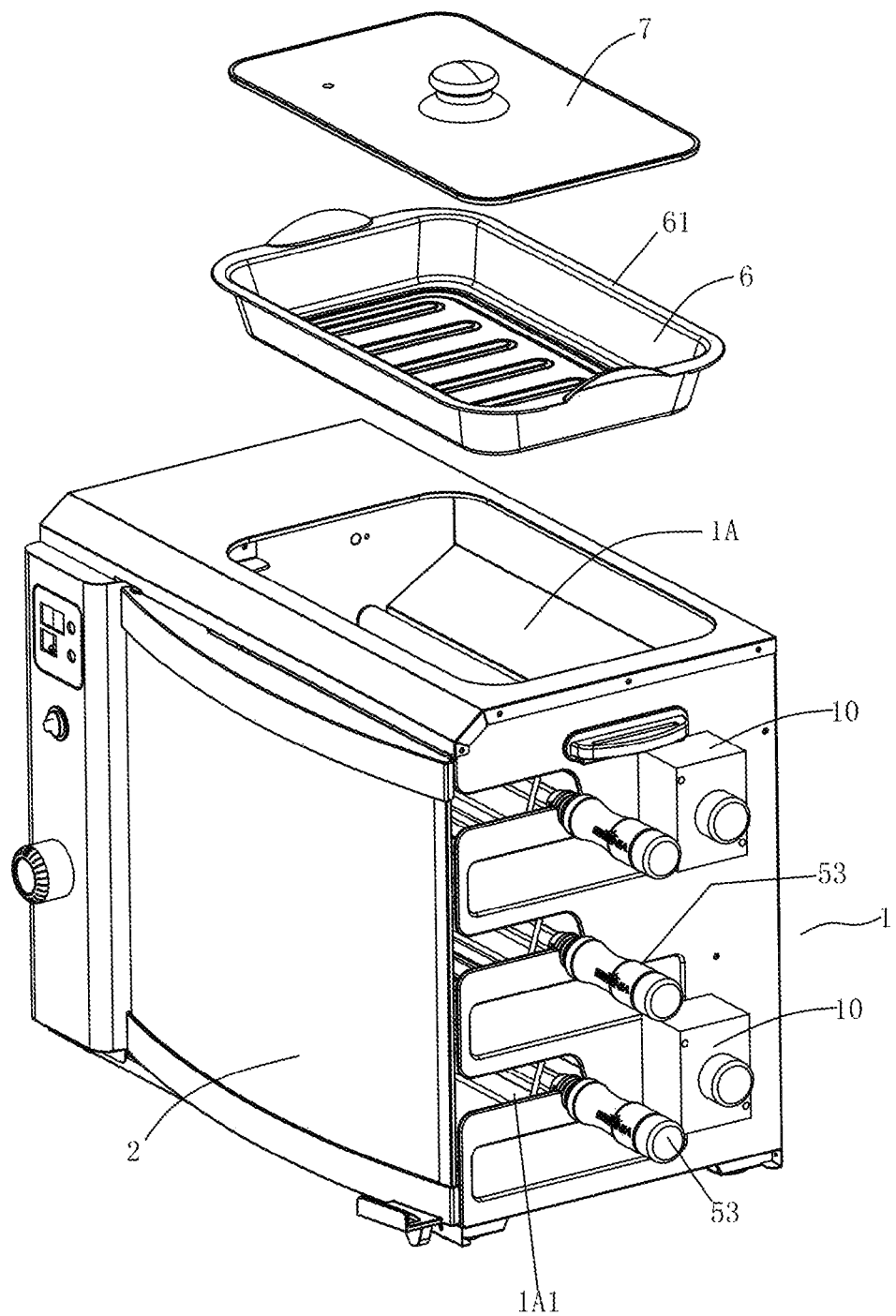
Figure 8:
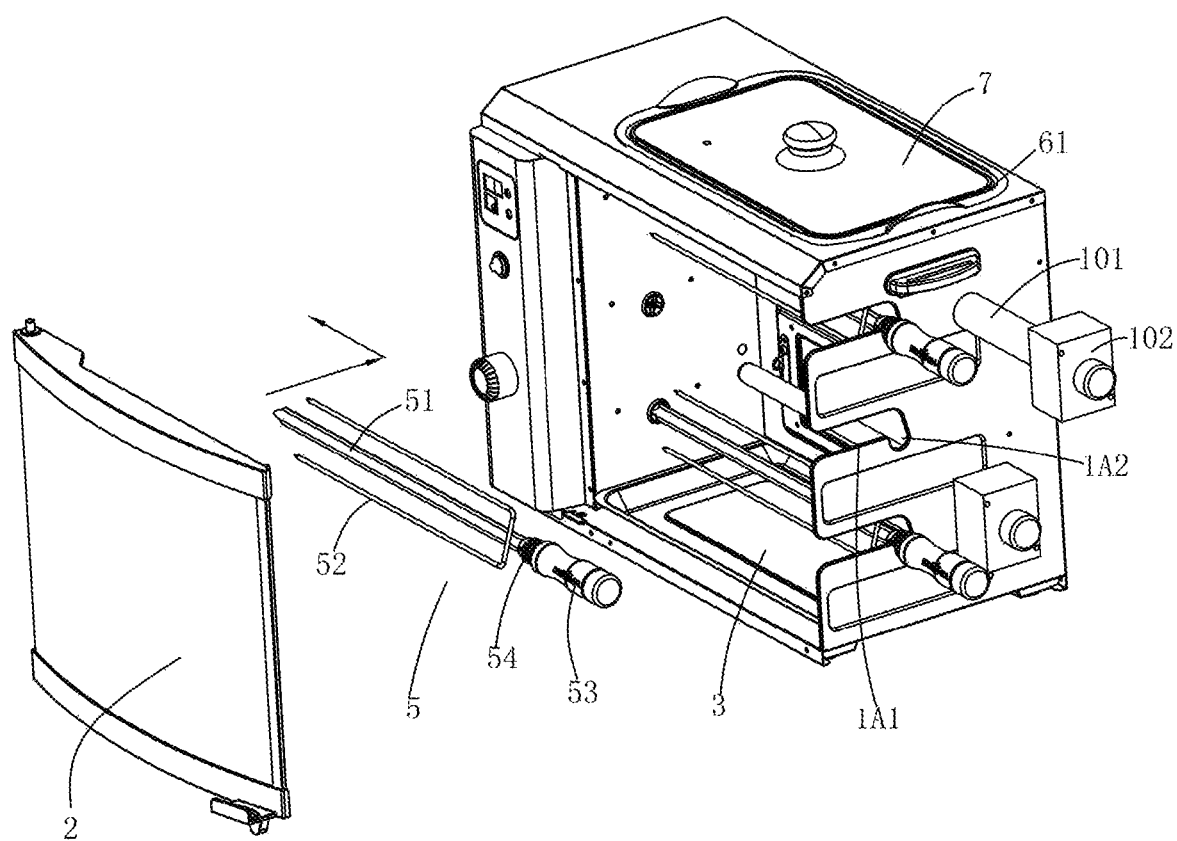

FIG. 1 is a top view of the invention.
FIG. 2 is A-A view of FIG. 1.
FIG. 3 is B-B view of FIG. 1.
FIG. 4 is C-C view of FIG. 1.
FIG. 5 is D-D view of FIG. 4.
FIG. 6 is a stereogram of the invention.
FIG. 7 is one of the stereoscopic decomposition diagrams of the invention.
FIG. 8 is the second stereoscopic decomposition diagram of the invention.

MODE OF CARRYING OUT THE INVENTION

The present invention is further described in combination with the attached drawings.

As shown in FIG. 1, FIG. 2, FIG. 3, FIG. 4, an electric gas dual-purpose frying oven, including shell 1, door body 2, oil pan 3, synchronous motor 41, motor bracket 42, sub-clutch 43, grill with clutch 5, frying pan 6, frying pan cover 7, infrared gas burner 8 and gas valve 9; Shell 1 includes the front opening and the top opening of the baking cavity 1A which is located in the control cavity 1B at one end and the holding cavity 1C at the lower back. The baking cavity 1A and the holding cavity 1C are set before and after. The baffle between the holding cavity 1C and the baking cavity 1A is provided with burner hole 1D. An inlet groove 1A1 and a pivot groove 1A2 communicated with the inlet groove are arranged on the end wall plate of baking cavity 1A. The inlet groove 1A1 is set horizontally. There is a rotating hole 1E which is provided with a sub-clutch on the longitudinal wall plate between baking chamber 1A and control chamber 1B. Grille 5 rotates with pivot slot 1A2, and the child clutch 43 is detachable with the mother clutch. The gas pipeline is connected with the infrared burner from the control chamber 1B into the accommodating chamber 1C; Infrared burner 8 passes through the burner hole 1D and is fixedly connected with the baffle; Frying pan 6 extends into baking cavity 1A through the top opening. The annular edge 61 of baking pan 6 and the top support of baking cavity 1A cooperate to open door body 2, and oil pan 3 can be taken out.

The model also includes an electric heating pipe 10, which comprises a pipe body 101, the head of the pipe body and a base plate part 102 made with the head. The electrical heating pipe 10 is a light wave pipe.

The end wall plate of baking cavity 1A is provided with a plug hole.

The tube body part 101 is extended into the baking cavity 1A through the socket hole. The head is connected with the socket hole and can be disassembled.

It is including rechargeable lithium battery 11, lithium battery 11 and synchronous motor 41 connected. Also including charging interface, charging interface is located in the control cavity, charging interface and lithium battery connected; It also includes an adapter, which charges the lithium-ion battery 11.

The synchronous motor 41 is fixedly connected with the motor bracket 42, and the sub-clutch 43 is located in the motor bracket 42. One end of the sub-clutch 43 is connected with the shaft of the synchronous motor, and the other end is embedded in the rotating hole 1E for rotation coordination.

The grill with clutch 5 including axis body 51, food stand which is placed on the shaft body 52, carrying handle 53 and circular rotation base 54, axis body 51 end shall body with carrying handle and connect the other end is equipped with clutch, round turn base 54, the outer circumferential surface with annular groove 541, circular rotating base 54 is located in the axis body 51 with carrying handle 53 adjacent side.

The circular rotating base 54 slides with the leading slot 1A1, the guide slot 541 rotates with the pivot slot 1A2, and the width of the guide slot 541 is greater than the thickness of the endwall at the pivot slot 1A2

As shown in FIG. 8, when grill 5 is assembled, the annular guide groove 541 of circular rotating base 54 moves in the leading slot 1A1, and then the circular rotating base 541 moves into the pivot slot 1A2, and then moves to the left. The sub-clutch 43 engages with the main clutch. The arrow direction of the solid line is shown in FIG. 8.

What is mentioned above is only the priority implementation mode of the invention. It should be pointed out that for ordinary technicians in the field, certain improvements and variations can be made without deviating from the principles of the invention, which is also regarded as the protection scope of the invention.

The invention claimed is:

1. An electric and gas dual-purpose frying oven comprising: a shell, a door body, an oil receiver, a synchronous motor, a motor bracket, a sub-clutch and a mother clutch, a grill frying pan, and a frying pan cover, an infrared gas burner and a gas valve;
   wherein the shell is composed of a control chamber with a front opening and a top opening at one end and a holding chamber with a back lower part, an inlet groove and a pivot joint groove communicated with the inlet groove are arranged on an end wall plate of a baking chamber; between the baking chamber and the control chamber is a rotating hole which is provided with the sub-clutch on a longitudinal wall plate; a grill rotates with a pivot slot, and a clutch works with the sub-clutch; the infrared gas burner passes through a burner hole and is fixedly connected with a baffle; the grill frying pan fits into a baking cavity through the top opening, and a ring edge plate of the grill frying pan matches with a top plate of the baking cavity; an electric heating pipe including a head of a tube, a body and a seat plate made with the head; the end wall plate of the baking cavity is provided with a socket hole; the tube extends into the baking cavity through the socket hole, and the head is connected with the socket hole and is disassembled.

2. The electric and gas dual-purpose oven according to claim 1, further comprising a rechargeable lithium battery connected with the synchronous motor.

3. The electric and gas dual-purpose oven according to claim 1, wherein the synchronous motor is fixedly connected with the motor bracket, the sub-clutch is set in the motor bracket, one end of the sub-clutch is connected with a shaft of the synchronous motor, and the other end is embedded in the rotating hole.

4. The electric and gas dual-purpose oven according to claim 1, wherein the grill with the clutch and sub-clutch includes an axis, a food rack, a holding handle and a circular rotating seat on which a shaft body is placed; an end of the shaft body is connected with the holding handle, and the other end is the clutch; the circular rotating seat is in coordination with a slide of a leading slot, and a guide slot is in coordination with the pivot slot.

5. The electric and gas dual-purpose oven according to claim 1, the electric heating tube is a light wave tube.

\* \* \* \* \*